Oct. 13, 1953 H. W. ALLEN 2,655,638
WATERPROOF AND PRESSUREPROOF CONNECTOR
Filed Sept. 19, 1951 2 Sheets-Sheet 1

INVENTOR.
HARRY W. ALLEN
BY
ATTORNEYS

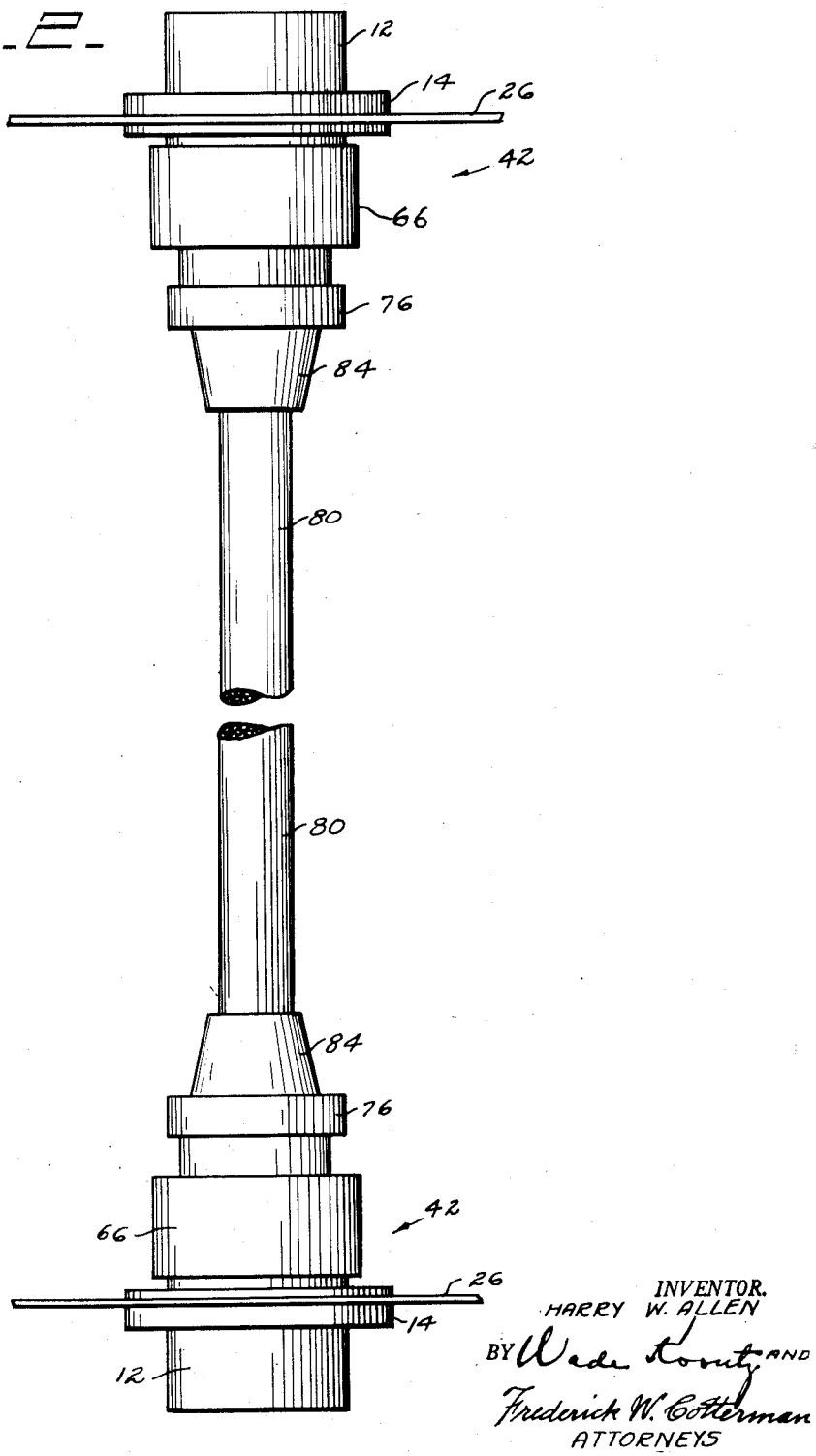

Patented Oct. 13, 1953

2,655,638

UNITED STATES PATENT OFFICE 2,655,638

WATERPROOF AND PRESSUREPROOF CONNECTOR

Harry W. Allen, Dayton, Ohio

Application September 19, 1951, Serial No. 247,353

2 Claims. (Cl. 339—28)

(Granted under Title 35, U. S. Code (1952), sec. 266)

The invention described herein may be manufactured and used by or for the United States Government for governmental purposes without payment to me of any royalty thereon.

This invention relates to improvements in multiple electrical connectors of the type commonly used for quickly interconnecting the various equipment in aircraft radio practice, but while the prior art connectors merely provide means of making quick dependable connections between equipment, components, or systems, the connector hereinafter described as the subject of this application has all of the desirable features of the known art with a considerable number of novel features combined therewith.

One of the novel improvements herein disclosed and made a part of this invention consists in pressurizing the receptacle to adapt it for use in connection with pressurized or waterproof equipment wherein the equipment is effectively sealed against leakage of both air and water.

Another novel improvement consists in pressurizing a multiple contact plug mating with the receptacle, supra, which effectively seals the receptacle against air or water leakage and protects the receptacle against electrolysis if the equipment should be submerged while voltages were present.

Since both plug and receptacle effectively seal the equipment on which they are being used, the equipment may be submerged, if desired, and will still remain operable.

The invention additionally contemplates waterproofing and pressurizing the cabling between plugs so that whole systems, including the wiring between components or equipment may be pressurized.

In the drawing,

Fig. 2 shows how two connectors of the kind shown in Fig. 1 may be joined by cable and the whole pressurized and waterproofed.

Figure 1:
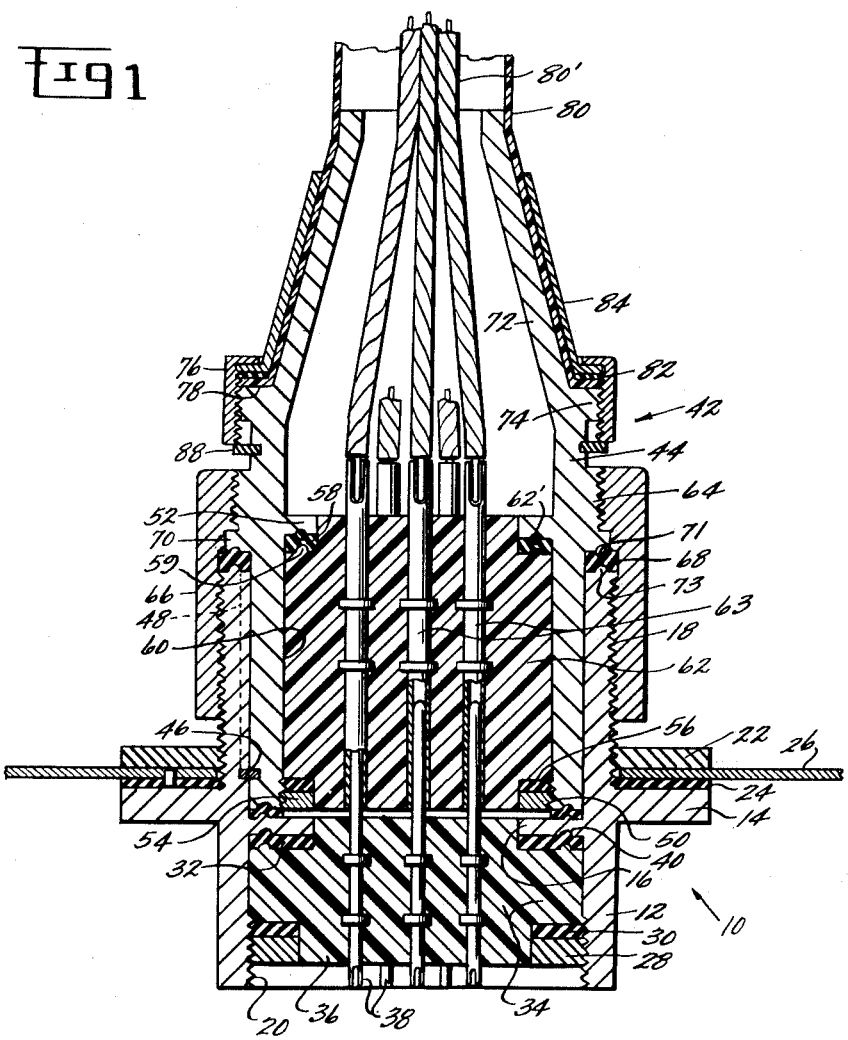
Fig. 1 is a longitudinal axial section through a complete waterproof and pressureproof connector.

For purposes of clarity in description, the assembly which remains fast on the panel may preferably be referred to as the "receptacle," while the assembly which may be uncoupled from the receptacle may preferably be referred to as the "plug." Similarly, the individual contact members which are a part of the receptacle assembly may preferably be referred to as the "pins" while the individual contact members which are a part of the plug assembly may be referred to as the "sockets."

Referring now to the drawing, the receptacle 10 comprises a cylindrical housing 12 having an external flange 14 and an internal flange 16. The longer hub of the receptacle is threaded externally as at 18, while the shorter hub is threaded internally as at 20. An internally threaded nut 22 is fitted to the threads 18 and is adapted to clamp a gasket 24 and the panel 26 upon which the receptacle is mounted between the flange 14 and the nut 22. An externally threaded nut 28 is fitted to internal threads 20 and is adapted to clamp the gaskets 30 and 32 and the shouldered portion 34 of the molded receptacle insert 36 against the internal flange 16. The molded receptacle insert 36 has one or a plurality of contact pins 38 imbedded therein. The internal flange 16 has an annular bead 40 of semicircular cross section in its one side into which a corresponding bead is formed on the gasket 32.

The plug 42 comprises a housing 44, cylindrical at one end and frusto-conical at the other end. The cylindrical portion of the plug housing 44 carries a guide pin 46 on its external surface which engages a groove 48 to prevent relative rotation of the plug and receptacle. The cylindrical portion is internally threaded at one end as at 50 and is provided with an internal flange 52. An externally threaded nut 54 is adapted to clamp together the gaskets 56 and 58 with the shouldered portion 60 of the plug insert 62 therebetween. A bead 59 is formed on the shoulder of the molded insert 62 and a corresponding groove 62' is formed on the face of the internal flange 52, whereby light tightening of the nut 54 makes a perfect seal.

One or more contact sockets 63 are imbedded in the molded plastic plug insert 62 positioned to receive the pins 38 of the receptacle insert 36. The other extremities of pins 38 of the receptacle are adapted to have the desired leads connected thereto as by soldering.

Intermediate the ends of the cylindrical portion, the plug housing 44 has an annular rib 64 which is externally threaded to receive the nut 66, which also threadedly engages the threads 18 of the receptacle housing 12, whereby the gasket 68 is clamped between the flange 70 and the upper end of the receptacle housing 12. Flange 70 of the plug housing 44 has an outer diameter equal to the inside diameter of the threaded portion 18 of the receptacle. The bottom of the flange contains a groove 71. The upper rim of the receptacle shell has a bead 73 which mates with the groove 71 when the plug 42 is inserted in the receptacle 10. The gasket 68 is pressed between the flange 70 and the upper end of the receptacle housing 18. Screwing up the nut 66 makes a perfect seal.

At the beginning of the frusto-conical portion 72 of the plug housing 44, the housing carries an annular rib 74 externally threaded for the shoulder nut 76 for clamping the flange 78 of the cable sheath 80 formed of a vinyl resin such as Vinylite between the rib 74 and a gasket 82, at the same time clamping a frusto-conical ferrule 84 around the sheath 80. While the sheath 80 for consistency shall be designated as a Vinylite sheath herein, the sheath may be formed of any vinyl resin of similar characteristics.

The connecting wires in the cable 80' which extend to the individual sockets 63 of the plug 42 are completely enclosed in the Vinylite sheath 80 whereby the pressure at which the plug and cable were sealed is maintained and water or moisture is excluded. The Vinylite tubing 80 which forms the cable sheath is formed over the frusto-conical end 72 of the plug housing 44, and being clamped between the housing part 72 and the ferrule 84 by the nut 76 makes a perfect seal even though hand pressure only is applied. A snap ring 88 may be added and placed partly around the plug housing 44 where it prevents the nut 66 reaching the threaded section of the plug where it might loosen the nut 76 when the plug is being removed from the receptacle. The snap ring also assists in removing the plug from the receptacle by acting as a back stop against which nut 66 exerts a pressure when being unscrewed which tends to pull the plug from the receptacle.

In Fig. 2, two of the plugs 42 as are seen in Fig. 1 have their respective sockets 63 connected by the individual wires of a cable wherein the frusto-conical ends of the plugs are joined by a single Vinylite sheath which surrounds the cable so that whole systems may be pressurized as a unit.

Air under pressure is a very good insulator. Its constant (K) at sea level is taken as 1 and used in measuring the value of other dielectric materials.

Airplane equipment is normally used between sea level and 40,000 feet altitude and at this altitude air is not nearly so good an insulator as it is at sea level.

It follows that insulation values in equipment operated at sea level have to be increased if the same equipment is to be used at 40,000 feet, and this in turn often requires complete redesign.

The plug and receptacle herein disclosed was designed to be used in conjunction with equipment in airtight containers which normally operate in changing altitudes. Use of this connector not only allows equipment to be operated under pressure but makes it possible for whole systems to be pressurized. This is particularly important in airplanes having pressurized compartments.

Slight modification of the connectors will permit the complete waterproofing of automobile and airplane engine ignitions, thus preventing many of the troubles to which they are now subject.

In addition to operating under severe moisture conditions the connector has been tested in operation under water for a period of seventy-two hours.

Having shown and described an embodiment of my invention, I claim:

1. In combination a plug member having an internal flange and spaced external flanges, a receptacle member having an internal flange and an external flange, said receptacle member being disposed concentrically with said plug member, one end thereof extending to adjacent one of said external flanges on the plug member and having a gasket sealingly interposed therebetween, the end of said plug member within the receptacle being spaced from the receptacle internal flange member and having a gasket sealingly interposed therebetween, a molded insert having contact pins within the receptacle, a gasket sealingly interposed between the molded insert and the receptacle internal flange, a molded insert within said plug member having sockets therein aligned with the contact pins, and means sealingly interposed between the plug insert and the plug internal flange, a waterproof, pressure resistant sheathing enclosing the other end of the plug, sealingly engaged with the other of said external flanges on the plug member and extending out from said plug member, and cable means having its individual wires connected to the sockets in the plug insert and extending coaxially within said sheathing and completely enclosed thereby.

2. The structure as set forth in claim 1 wherein two of said structures are aligned with their plug ends opposed and cable means connecting the cable wires attached to their respective sockets, the sheathing being arranged coextensive with the cable means whereby a waterproof, pressurized unit obtains.

HARRY W. ALLEN.

References Cited in the file of this patent

UNITED STATES PATENTS

| Number | Name | Date |
|---|---|---|
| 2,450,528 | Sprigg | Oct. 5, 1948 |

OTHER REFERENCES

Abstract of appl. Ser. No. 548,121, published November 8, 1949.